United States Patent [19]

Ito et al.

[11] Patent Number: 4,918,606
[45] Date of Patent: Apr. 17, 1990

[54] AUTOMATIC TRANSMISSION WITH FAIL-SAFE FUNCTION

[75] Inventors: Yasunobu Ito; Masanari Yamamoto, both of Anjo, Japan

[73] Assignee: Aisin-Warner Kabushiki Kaisha, Aichi, Japan

[21] Appl. No.: 396,793

[22] Filed: Aug. 21, 1989

Related U.S. Application Data

[63] Continuation of Ser. No. 83,393, Aug. 10, 1987, abandoned.

[30] Foreign Application Priority Data

Aug. 11, 1986 [JP] Japan .................. 61-188194

[51] Int. Cl.⁴ .................. B60K 41/08; G06F 15/50
[52] U.S. Cl. .................. 364/424.1; 74/866
[58] Field of Search .................. 364/424.1, 426; 74/866

[56] References Cited

U.S. PATENT DOCUMENTS

| | | | |
|---|---|---|---|
| 4,363,973 | 12/1982 | Kawata et al. | 364/424.1 |
| 4,476,530 | 10/1984 | Pannier et al. | 364/424.1 |
| 4,584,906 | 4/1986 | Nagaoka et al. | 364/424.1 |
| 4,635,508 | 1/1987 | Tatsumi | 74/866 |
| 4,722,094 | 1/1988 | Goodzey | 364/426 |
| 4,747,056 | 5/1988 | Yamamoto et al. | 364/424.1 |

FOREIGN PATENT DOCUMENTS 59-143724  8/1984  Japan .

Primary Examiner—Parshotam S. Lall
Assistant Examiner—Christopher L. Makay
Attorney, Agent, or Firm—Varndell Legal Group

[57] ABSTRACT

A rate of change in vehicle velocity is calculated by comparing a present vehicle velocity signal and an immediately preceding vehicle velocity signal. If the rate of change in vehicle velocity is greater than a rate of change capable of being produced by actual traveling of the vehicle, a decision is rendered to the effect that the vehicle velocity sensor is faulty, fail-safe mode processing is executed and the automatic transmission is controlled in such a manner that traveling of the vehicle will not be impaired. Thus, if the vehicle velocity sensor malfunctions, the automatic transmission can be controlled so as not to impair traveling of the vehicle, thereby allowing the vehicle to travel safely and stably. The fail-safe function can be performed satisfactorily even if only a single vehicle velocity sensor is provided.

6 Claims, 4 Drawing Sheets

AUTOMATIC TRANSMISSION WITH FAIL-SAFE FUNCTION

This application is a continuation of application Ser. No. 083,393, filed 8/10/87, now abandoned.

BACKGROUND OF THE INVENTION

This invention relates to a fail-safe function for dealing with failure of a vehicle velocity sensor in an automatic transmission controlled by a microcomputer.

In a microcomputer-controlled automatic transmission, shifting generally is controlled on the basis of signals from a vehicle velocity sensor and throttle opening sensor. The automatic transmission comprises a well-known group of planetary gears and a friction engagement unit for locking and releasing the elements of the planetary gears. By selectively actuating friction elements automatically in a hydraulic circuit in dependence upon the traveling condition of the vehicle, the vehicle can be made to travel in an optimum speed. On the basis of a combination of on/off signals applied to shift solenoids 1, 2, shown in FIG. 1, to energize or de-energize them, the aforementioned friction elements are selectively actuated. More specifically, an electronic control unit (ECU) includes an input signal converting circuit 5, a CPU 6 and a solenoid driver circuit 7. Output signals from a vehicle velocity sensor 3 and a throttle opening sensor 4 are applied to the CPU 6 via the input signal converting circuit 5. The CPU 6 has a memory storing gear-change patterns. A gear-change pattern which corresponds to the shift position (e.g. D range or L range) is selected, an optimum speed commensurate with the vehicle velocity and throttle opening is decided on the basis of the selected gear-change pattern, and an appropriate signal is delivered to the solenoid driver circuit 7 to actuate the solenoids 1, 2 accordingly.

When the vehicle velocity sensor develops an abnormality in the conventional microcomputer-controlled automatic transmission described above, the signal indictive of vehicle velocity is no longer produced despite the fact that the vehicle is traveling. As a result, the microcomputer mistakenly renders a decision to the effect that the velocity is zero, i.e. that the vehicle is at rest, and places the automatic transmission in first gear. This produces a gear-change shock and impedes vehicle travel. In order to solve this problem, two vehicle velocity sensors are provided, one on the transmission output shaft and one inside the speedometer or the like, for the purpose of obtaining velocity signals in each of the two systems. Then, if one of the velocity sensors malfunctions, the signal from the other sensor will be applied to the microcomputer. In other words, the transmission is provided with a fail-safe function. However, if both of the velocity sensors should happen to malfunction simultaneously, the original problem will arise. Thus, the aforementioned solution is not an effective one.

SUMMARY OF THE INVENTION

Accordingly, an object of the invention is to provide an automatic transmission with a fail-safe function in which a fault in a vehicle velocity sensor is sensed and, in response thereto, the automatic transmission is controlled in a state which will not impede the travel of the vehicle.

According to the present invention, the foregoing object is attained by providing an automatic transmission with a fail-safe function in which shift solenoids are controlled by a microcomputer in dependence upon a signal indicative of vehicle velocity and a signal indicative of throttle opening, characterized by calculating a rate of change in vehicle velocity by comparing a signal indicative of present vehicle velocity and a signal indicative of immediately preceding vehicle velocity, and controlling the shift solenoids in such a manner that fail-safe mode processing is executed in a case where the rate of change in vehicle velocity is greater than a predetermined value.

In accordance with the invention, a rate of change in vehicle velocity is calculated by comparing a present vehicle velocity signal and an immediately preceding vehicle velocity signal. If the rate of change in vehicle velocity is greater than a rate of change capable of being produced by actual traveling of the vehicle (e.g. if the vehicle velocity suddenly changes from 50 Km/h to 0 Km/h), a decision is rendered to the effect that the vehicle velocity sensor is faulty, fail-safe mode processing is executed and the automatic transmission is controlled in such a manner that traveling of the vehicle will not be impaired.

Thus, if the vehicle velocity sensor malfunctions, the automatic transmission can be controlled so as not to impair traveling of the vehicle, thereby allowing the vehicle to travel safely and stably. The fail-safe function can be performed satisfactorily even if only a single vehicle velocity sensor is provided. In addition, the invention is effective in terms of enhancing the durability of the transmission friction members which are subjected to great wear when the transmission is suddenly downshifted.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENT

A preferred embodiment of the invention will now be described with reference to the drawings.

Figure 1:
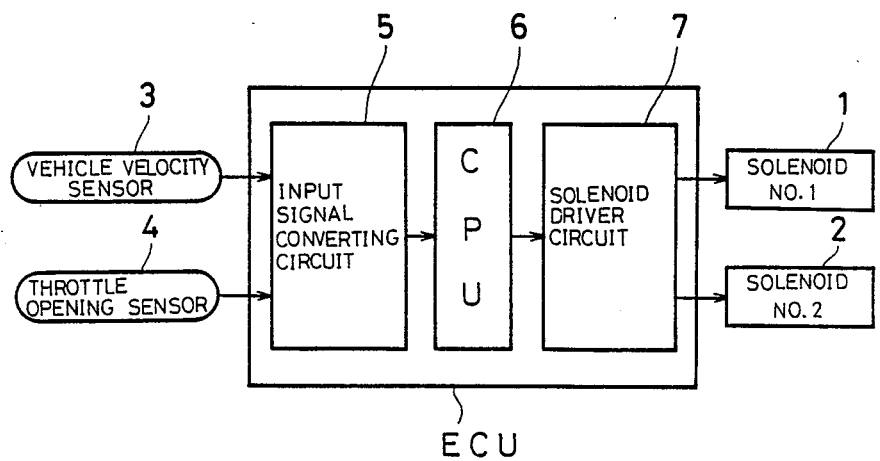
FIG. 1 is a block diagram illustrating an embodiment of a control system of an automatic transmission with a fail-safe function in accordance with the invention.

A description of the block diagram of FIG. 1 has already been given and need not be repeated here.

Figure 2:
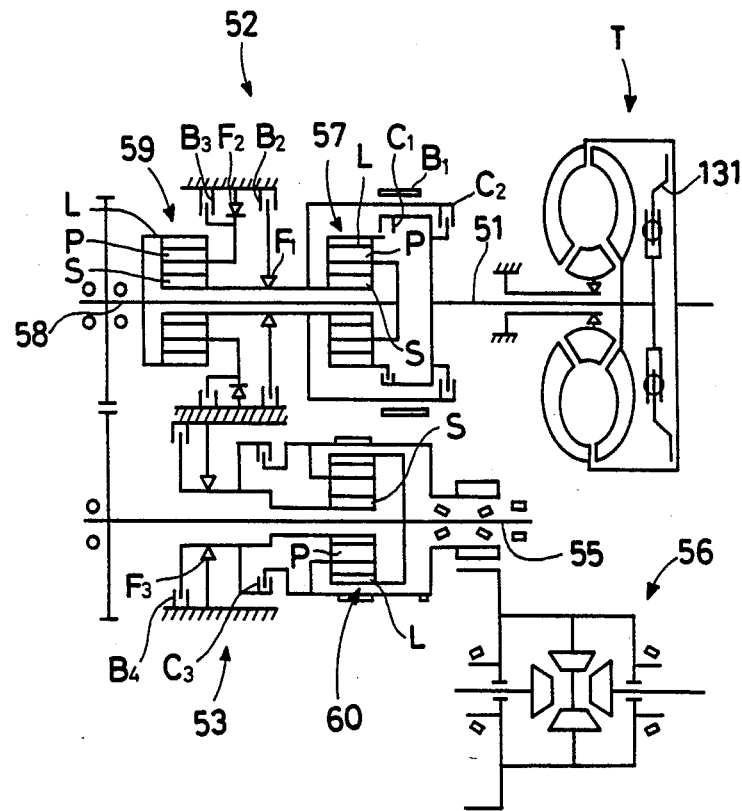
FIG. 2 is a schematic view of a transfer system illustrating one example of an automatic transmission to which the present invention is applied.

With reference to FIG. 2, there is shown an automatic transmission comprising a torque converter T having a lock-up clutch 131 and an output shaft 51, a gear change mechanism 52 coupled to the output shaft 51 of the torque converter T and having three forward speeds and one reverse speed, an overdrive mechanism 53 coupled to the gear change mechanism in parallel relation and having an output shaft 55, and a differential gear 5 coupled to the output shaft 55 of the overdrive mechanism 53.

A first planetary gear mechanism 57 and a second planetary gear mechanism 59 are arranged between the output shaft 51 of the torque converter T and the output shaft 58 of the gear change mechanism 52. A third planetary gear mechanism 60 is arranged on the output shaft 55 of the overdrive mechanism 53. The planetary gear mechanisms 57, 59 and 60 each comprise a sun gear S, a ring gear L and a planetary gear P. These gear mechanisms 57, 59 and 60 also include one-way clutches F1, F2, F3, respectively. A friction engaging unit is provided for engaging and releasing these elements. The friction engaging unit includes multiple-disk clutches C1, C2, C3, a hand brake B1, and multiple-disk brakes B2, B3, B4. As will be described below, gears are shifted for three forward speeds, one reverse speed and overdrive base on which of the friction elements of the friction engaging unit are released or locked.

Figure 3:
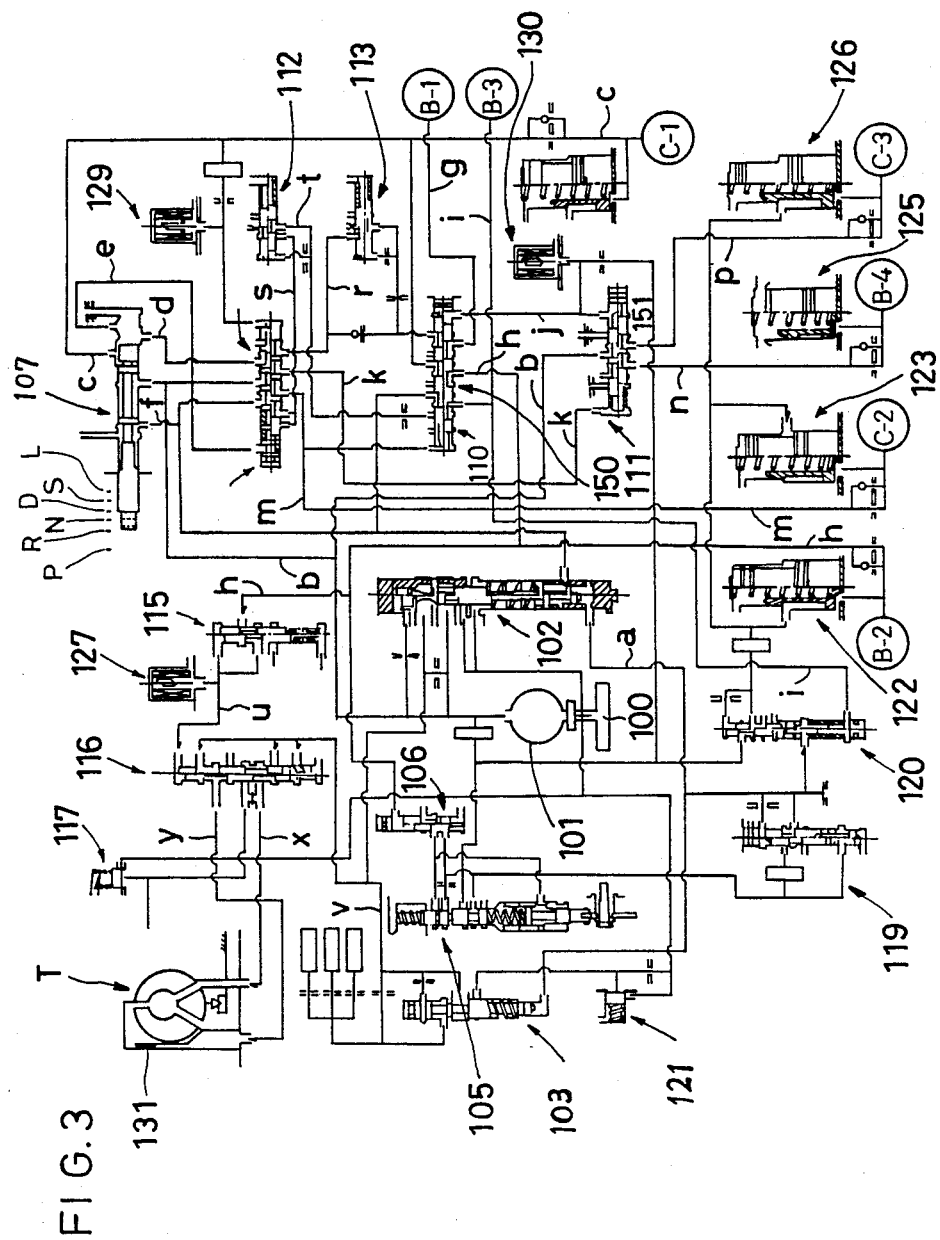
FIG. 3 is a view of a hydraulic circuit of the automatic transmission shown in FIG. 2.

FIG. 3 is a view illustrating the entirety of a hydraulic control circuit in the above-described automatic transmission. The hydraulic control circuit comprises an oil reservoir 100, an oil pump 101, a primary regulator valve 102, a secondary regulator valve 103, a throttle valve 105, a cut-back valve 106, a manual valve 107, a 2-3 shift valve 109, a 1-2 shift valve 110, a 3-4 shift valve 111, a low-coast modulator valve 112, a second-coast modulator valve 113, a lock-up modulator valve 115, a lock-up control valve 116, a cooler bypass valve 117, a throttle modulator valve 119, an accumulator control valve 120, an exhaust hydraulic pressure relief valve 121, accumulators 122, 123, 125 and 126, solenoids 127, 129 and 130, clutch hydraulic pressure servos C-1, C-2 and C-3, brake hydraulic pressure servos B-1, B-2, B-3 and B-4, the lock-up clutch 131, the torque converter T, oil lines connecting these valves and devices orifices, flow rate control valves with check valves, and oil strainers.

In operation, working oil drawn up from the oil reservoir 100 by the oil pump 101 is regulated to a predetermined line pressure by the primary regulator valve 102 before being fed into oil lines a and b. The oil in line a is delivered to the secondary regulator valve 103 where it is regulated to a predetermined torque converter pressure, which conforms to the throttle pressure of the throttle valve 105, the lubricant oil pressure and the cooler pressure. A spool in the manual valve 107 connected to the oil line b is moved in dependence upon the shift lever position, namely the P (parking), R (reverse), N (neutral), D (drive), 2 (second) and L (low). As indicated in the table below, the oil line b is communicated with oil lines c, d, e and f in dependence upon the shift position.

TABLE 1

|            | P | R | N | D | S | L |
|------------|---|---|---|---|---|---|
| Oil Line c | X | X | X | O | O | O |
| Oil Line d | X | X | X | X | O | O |
| Oil Line e | X | X | X | X | X | O |
| Oil Line f | X | O | X | X | X | X |

Operation with regard to each shift position will now be described.

(a) When manual valve 107 is shifted to the D range.

As shown in Table 1, the oil lines b and c are communicated to supply line pressure to the clutch C-1, thereby engaging the same. When the vehicle is traveling in first gear, the solenoid valve 129 is ON, the solenoid valve 130 is OFF, the a spool 150 in the 1-2 shift valve 110 is on the left side, the oil lines g, h communicating with the brakes B-1, B-2 are exhausted, and an oil line i communicating with the brake B-3 is also supplied with hydraulic pressure. As a result, the brakes B-1, B-2 and B-3 are released.

When the vehicle velocity surpasses a preset value, the solenoid valve 130 is energized by an output from the microcomputer and the solenoid pressure in line j, which is the control hydraulic pressure of the 1-2 shift solenoid valve 110, falls to a low level, whereby the spool 150 in 1-2 shift valve 110 is moved to the right side so that hydraulic pressure is supplied via oil line c, 1-2 shift valve 110 and oil line h. As a result, the brake B-2 is engaged to effect a shift to second gear. At this time a spool 151 in 3-4 shift valve 111 is fixed on the right side by hydraulic pressure in line k, so that the transmission remains in second gear even when the solenoid valve 130 is energized.

To shift up to third gear, the solenoid valve 129 is deenergized by an output from the microcomputer when vehicle velocity, throttle opening and the like attain predetermined values. A spool 152 in the 2-3 shift valve 109 is moved to the left side to supply hydraulic pressure via the oil line b, 2-3 shift valve 109 and oil line m, thereby engaging the clutch C-2. At the same time, the spool 150 of the 1-2 shift valve 110 is fixed on the right side (on the side for second, third and fourth gear) by line pressure supplied by oil line m.

To shift up to fourth gear, the solenoid valve 130 is deenergized by an output from the microcomputer, as set forth above, so that the hydraulic pressure in oil line j reverts to the high level. The spool 151 of 3-4 shift valve 111 is moved to the left side, the oil line n is exhausted, hydraulic pressure is supplied to the oil line p, brake B-4 is released and clutch C-3 is engaged.

(b) When manual valve 107 is shifted to the 2 range

As shown in Table 1, line pressure is supplied to oil line d in addition to oil line c. A shift to first, second and third gears is performed as in the D range. However, since line pressure is supplied to the 3-4 shift valve 111 via oil line d, 2-3 shift valve 109 and oil line k, the spool 151 is fixed on the right side and a shift to fourth gear does not take place.

If a manual shift from drive (D) to second (2) is performed while the vehicle is traveling in fourth speed and the manual valve 107 is in the D range, line pressure is supplied to the left end of spool 151, as described above, so that the transmission is immediately downshifted to third gear. At the moment the vehicle decelerates down to a predetermined velocity, the solenoid valve 129 is energized by an output from the microcomputer and the transmission is downshifted to second gear. At this time, second-coast modulator pressure is supplied to the brake B-1 via the oil line d, 2-3 shift valve 109, oil line r, second-coast modulator valve 113, 1-2 shift valve 110 and oil line g. As a result, the brake B-1 is slowly engaged so that the vehicle makes the transition to travel in second gear as engine braking is applied.

(c) When the manual valve 107 is shifted to the L range

As shown in Table 1, line pressure is supplied to the oil line e in addition to the oil lines c and d. Second gear is achieved in the same manner as when the manual valve 107 was placed in the D range, and the spool 152 in the 2-3 shift valve 109 is fixed on the right side. In first gear, low-coast modulator pressure is supplied via oil line e, 2-3 shift valve 109, oil line s, low-coast modulator valve 112, oil line t, 1-2 shift valve 110 and oil line i, whereby the brake B-3 is engaged to apply engaging braking and attain first gear.

When the transmission is shifted to the L range while the vehicle is cruising in third gear, line pressure is supplied to the left end of spool 152 from oil line e, as described above, solenoid valve 129 is energized and a downshift is made immediately to second gear. When the vehicle decelerates down to a predetermined velocity, the solenoid valve 130 is energized by an output from the microcomputer and the transmission is shifted down to first gear. The transition to first gear is made with the application of engine braking, as set forth above.

(d) When the manual valve 107 is shifted to the N or P range

As shown in Table 1, line pressure is not supplied to any of oil lines c, d, e and f, solenoid valve 129 is turned ON, and solenoid valve 130 is turned OFF. Line pressure is supplied from oil line j to the lands on the right ends of 1-2 shift valve 110 and 3-4 shift valve 111, the spool 150 is set on the left side (the side for first gear), and the spool 151 is set on the right side (the side for first and third gears) due to line pressure supplied to the land on its right end from oil line h via oil line b and the 2-3 shift valve 109. As a result, line pressure is supplied from oil line b 3-4 shift valve 11 and oil line n, whereby only brake B-4 is engaged to establish the neutral state.

(e) When manual valve 107 is shifted to the R range

Oil lines b and f are brought into communication, oil lines d and e are exhausted, solenoid 129 is turned ON, and solenoid valve 130 is turned OFF. The spool 152 of the 2-3 shift valve 109 is set to the right side and line pressure is developed in both oil lines m and k. As a result, the spools 150, 151 of the 1-2 shift valve 110 and 3-4 shift valve 111 are both fixed on the right side, whereby clutch C-2 and brakes B-3, B-4 are engaged to achieve the reverse state.

Hydraulic control of the lock-up clutch 131 will now be described.

If the manual valve 107 is shifted to the D, 2 or L range, line pressure is developed in oil line c and the 1-2 shift valve 110 is set on the side for second gear, then pressure is developed in oil line h and line pressure is supplied to the lock-up modulator valve 115. Pressure modulated in the lock-up modulator valve 115 is controlled to a predetermined hydraulic pressure by the solenoid valve 127 and is supplied to the lock-up control valve 116 via an oil line u. On the other hand, the lock-up valve 116 is supplied with secondary pressure received from the secondary regulator valve 103 via an oil line v. Hydraulic pressure controlled in the lock-up control valve 116 is supplied to both sides of the lock-up clutch 131 inside the torque converter T via oil lines x and y. As a result, the torque converter T is controlled so as to operate in a torque converter region, slip region (half-clutched region) or lock-up region.

The operation of the above-described hydraulic pressure control circuit is summarized in the following table:

TABLE 2

|   |   | Solenoid $S_1S_2S_3$ | Clutch $C_1C_2C_3$ | Brake $B_1B_2B_3B_4$ | One-Way $F_1F_2F_3$ |
|---|---|---|---|---|---|
| P |   | X X | X X X | X X X | X X X |
| R |   | X X | X   X | X X | X X X |
| N |   | X X | X X X | X X X | X X X |
| D | 1ST | X X | X X | X X X | X Δ Δ |
|   | 2ND |   | X X | X   X | Δ X Δ |
|   | 3RD | X |   X | X   X | X X Δ |
|   | 4TH | X X |   | X   X X | X X X |
| 2 | 1ST | X X | X X | X X X | X Δ Δ |
|   | 2ND |   | X X |   X | Δ X Δ |
|   | 3RD | X |   X | X   X | X X Δ |
| L | 1ST | X X | X X | X X | X Δ Δ |
|   | 2ND |   | X X |   X | Δ X Δ |

TABLE 2

In Table 2, the solenoid valves S1, S2, S3, correspond to the aforementioned solenoid valves 129, 130, 127, respectively, the O marks indicate that the solenoid valve is turned ON, that the clutch or brake is engaged or that the one-way clutch is in the locked state, the x marks indicate that the solenoid valve is turned OFF, that the clutch or brake is released or that the one-way clutch is in the freed state, the mark indicates that the lock-up clutch is in an engagable state, and the mark Δ indicates that the one-way clutch is free when the vehicle is coasting and in the locked up state when the engine is being driven. In 3rd gear of the 2 range, a gear shift is performed at 100 km in order to prevent overrun.

Figure 4:
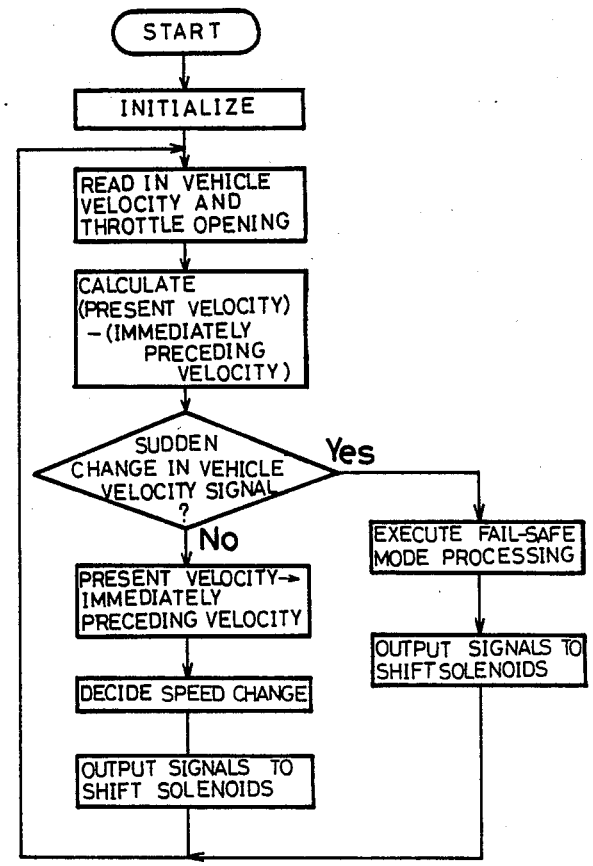
FIG. 4 is a flowchart of processing executed by a CPU in accordance with the invention.

The flow of processing executed by the CPU 6 shown in FIG. 1 will now be described with reference to FIG. 4.

The throttle opening and vehicle velocity are read in after initial values are set. As in the prior art, the signal from the vehicle velocity sensor indicative of vehicle velocity is sensed at all times. In addition, the vehicle velocity signal prevailing a certain period of time prior to the present (i.e. an immediately preceding velocity signal) is constantly being stored in memory. The rate of change in vehicle velocity is calculated by comparing the present velocity signal and the immediately preceding velocity signal. The rate of change can be the difference between the present velocity signal or the immediately preceding velocity signal or a differential value of the present velocity signal. Next, it is determined whether the rate of change in vehicle velocity exhibits a sudden variation.

If the rate of change in vehicle velocity lies within a range in which a change in velocity can be ascribed to actual travel of the vehicle, then the actual velocity is stored in memory as the immediately preceding vehicle velocity, after which a gear shift decision is made in dependence upon the throttle opening and vehicle velocity and the appropriate output signals are delivered to the shift solenoids. If the rate of change in vehicle velocity is greater than a change capable of being produced by actual travel of the vehicle (e.g. if the vehicle velocity suddenly changes from 50 Km/h to 0 Km/h), a decision is rendered to the effect that the vehicle velocity sensor is faulty, fail-safe mode processing is executed and the automatic transmission is controlled in such a manner that traveling of the vehicle will not be impaired. Examples of operation in the fail-safe mode are as follows:

(1) Signals are outputted to the shift solenoids in such a manner that the gear stage of the automatic transmission will be fixed at the gear which prevailed immediately prior to the detection of the velocity sensor failure.

(2) Signals are outputted to the shift solenoids in such a manner that the highest gear will be established in dependence upon each of the shift lever ranges.

(3) Control is so effected in each shift lever range as to avoid a gear that will impair traveling of the vehicle. For example, if the shift lever is in the L range, the transmission is fixed in second gear in order to avoid engine braking in first gear.

(4) The gears of the automatic transmission are fixed in second or third gear or the like irrespective of the shift lever position.

The fail-safe mode is cancelled by the driver stopping the vehicle, turning off the engine and then turning on the ignition. Thus, when the driver stops the vehicle, turns off the engine and then restarts the engine, the vehicle can be propelled forward starting from first gear even if the vehicle velocity signal is abnormal. It is possible to form any combination of the aforementioned four types of fail-safe mode and conditions for exiting from the fail-safe mode.

Thus, if the vehicle velocity sensor malfunctions, the automatic transmission can be controlled so as not to impair traveling of the vehicle, thereby allowing the vehicle to travel safely and stably. The fail-safe function can be performed satisfactorily even if only a single vehicle velocity sensor is provided. In addition, the invention is effective in terms of enhancing the durability of the transmission friction members which are subjected to great wear when the transmission is suddenly downshifted.

As many apparently widely different embodiments of the present invention can be made without departing from the spirit and scope thereof, it is to be understood that the invention is not limited to the specific embodiments thereof except as defined in the appended claims.

What we claim is:

1. An automatic transmission having shift solenoids controlled by a microcomputer in response to a vehicle velocity signal and a throttle opening signal, comprising:

computing means for computing a speed changing rate in the vehicle velocity by comparing a vehicle velocity signal indicating the present vehicle velocity with a vehicle velocity signal indicating an immediately preceding vehicle velocity; and fail-safe means for controlling said shift solenoids so that said automatic transmission is immediately and permanently set at a gear corresponding to said immediately preceding vehicle velocity until said vehicle is stopped when said speed changing rate computed by said computing means exceeds a predetermined value indicating at least a partial malfunctioning of said vehicle velocity sensor.

2. The automatic transmission according to claim 1, wherein said computing means includes means for continuously computing said speed changing rate; and when said speed changing rate exceeds said predetermined value, said gear is set by said fail-safe means.

3. The automatic transmission according to claim 1, wherein the fail-safe means sets said automatic transmission at a gear independent of shift lever position.

4. An automatic transmission having shift solenoids controlled by a microcomputer in response to a vehicle velocity signal and a throttle opening signal, comprising:

computing means for computing a speed changing rate in the vehicle velocity by comparing a vehicle velocity indicating the present vehicle velocity with a vehicle velocity signal indicating an immediately preceding vehicle velocity; and fail-safe means for controlling said shift solenoids so that said automatic transmission is immediately and permanently set at the highest-speed gear of the range presently selected by a shift lever of said transmission until said vehicle is stopped when said speed changing rate computed by said computing means exceeds a predetermined value indicating at least a partial malfunctioning of said vehicle velocity sensor.

5. The automatic transmission according to claim 4, wherein said computing means includes means for continuously computing said speed changing rate; and when said speed changing rate exceeds said predetermined value, said gear is set by said fail-safe means.

6. An automatic transmission comprising:

a vehicle velocity sensor, shift solenoids for selecting a gear of said transmission, microcomputer means for controlling said shift solenoids based in part on a vehicle velocity signal received from said vehicle velocity sensor, and fail-safe means for controlling aid shift solenoids based upon partial malfunctioning of said vehicle velocity sensor, said fail-safe means including computing means for computing a rate of change in vehicle velocity by comparing a vehicle velocity signal indicating present vehicle velocity with a vehicle velocity signal indicating an immediately preceding vehicle velocity, and means for setting a gear of said transmission corresponding to said immediately preceding vehicle velocity until said vehicle is stopped when said rate of change in vehicle velocity computed by said computing means exceeds a predetermined value indicating a partial malfunctioning of said vehicle velocity sensor.

* * * * *